United States Patent [19]

Ross

[11] Patent Number: 4,498,854
[45] Date of Patent: Feb. 12, 1985

[54] IN-MOLD LABELER—DUAL PARISON

[75] Inventor: John M. Ross, Des Plaines, Ill.

[73] Assignee: Continental Packaging Company, Inc., Stamford, Conn.

[21] Appl. No.: 434,152

[22] Filed: Oct. 13, 1982

[51] Int. Cl.³ .................. B65C 9/00; F15B 13/04; F15B 15/22
[52] U.S. Cl. ........................ 425/116; 91/6; 91/32; 91/454; 91/265; 91/463; 92/143; 92/85 R; 425/126 R; 425/522; 156/572
[58] Field of Search .............. 91/12, 16, 18, 236, 91/243, 244, 240, 265, 449, 452, 463, 443, 6, 32, 454; 156/572; 92/85 B, 85 R, 143; 425/116, 126 R, 522

[56] References Cited

U.S. PATENT DOCUMENTS

| | | | |
|---|---|---|---|
| 493,476 | 3/1893 | Burr | 156/572 |
| 2,653,580 | 9/1953 | Moore, Jr. | 91/463 X |
| 2,943,604 | 7/1960 | Chubb | 91/463 X |
| 3,025,838 | 3/1962 | Klancnik | 91/443 |
| 3,091,256 | 5/1963 | Becker | 91/32 X |
| 3,190,184 | 6/1965 | Carpenter | 91/219 |
| 3,202,060 | 8/1965 | Grotness | 91/443 |
| 3,559,536 | 2/1971 | Mason | 91/454 X |
| 4,002,103 | 1/1977 | Martin | 91/219 |
| 4,019,845 | 4/1977 | Birkhofer et al. | 91/449 X |
| 4,211,150 | 7/1980 | Framberg | 92/85 R |

Primary Examiner—Irwin C. Cohen
Attorney, Agent, or Firm—Charles E. Brown

[57] ABSTRACT

This relates to a pneumatic feed system for moving a labeler head of a labeling apparatus for depositing labels in mold halves of a blow molding apparatus. The relatively heavy labeler head must be rapidly accelerated and then rapidly decelerated and at the same time moved sufficiently so as to provide for a large number of back and forth cycles per minute. There is provided in association with compressible shock absorbers a pneumatic system including a high pressure supply and a low pressure supply together with throttle valves such that the gas in the unpressurized end of the cylinder is rapidly compressed near the end of the stroke to function as a shock absorber and further, the cylinder is of a much larger diameter than that required for moving the labeler head so as to permit for the rapid acceleration as well as the rapid deceleration.

7 Claims, 5 Drawing Figures

IN-MOLD LABELER—DUAL PARISON

This invention relates in general to new and useful improvements in pneumatic back and forth feed systems, and more particularly to a feed system for a transverse head of a labeler.

This invention particularly relates to a feed system wherein a device must be rapidly moved from one position to a second position and back to the first position with a minimum of time being rerequired to effect the movement of the device from one position to the other.

With respect to the specific environment of the invention, there has been developed systems wherein a labeler head is first positioned in alignment with hoppers for labels whereat labels are picked up by the labeler head. Then the labeler head is transferred into alignment with a rotating mold assembly and actuated to deposit one label in each of two mold halves. Such systems have operated at the desired high speeds.

When an attempt was made to modify the label applying systems so as to simultaneously apply labels to two sets of molds disposed in side by side relation, it was found that the bulk of the labeler head was such that utilizing known operable systems, the labeler head could be reciprocated only at a rate on the order of 42 back and forth cycles per minute. However, the rate of operation of the molding machine was on the order of 70 cycles per minute.

This invention particularly relates to a novel pneumatic feed system which will provide for the required rate of back and forth movement of the labeler head or like device.

Most particularly, this invention relates to the solving of the need for rapid acceleration at the beginning of the stroke and rapid deceleration at the end of the stroke.

In accordance with this invention there is associated with each end of the stroke a compressible shock absorber which makes the final determination as to the limit of each stroke. However, the shock absorber can absorb only part of the inertial force of the moving mass. It is therefore necessary to provide in the system means for effecting rapid deceleration near the end of each stroke. This is accomplished by permitting the gas trapped in the unpressurized end of the pneumatic cylinder to escape at only a relatively slow rate so that as the piston of the cylinder is rapidly advanced, there is a build up of gaseous pressure resisting movement of the piston towards its final part of the stroke.

Another feature of the invention is the utilization of a pneumatic cylinder which is much larger than that required to effect the movement of the labeler head or like device and wherein a very high gaseous pressure is emitted into the feed end of the cylinder during each stroke so as to provide for the initial rapid acceleration of the device such as a labeler head.

Further, there is associated with each end of the cylinder, in addition to the high pressure gaseous source, a lower pressure gaseous source which is of a sufficiently high pressure so as to hold the device in contact with the associated shock absorber with the shock absorber being retained in its compressed state. In this manner the shock absorber determines the final position of the movable device and does not serve to move the device backwards a short distance at the end of each stroke.

This invention also relates to the method of utilizing the pneumatic feed system.

With the above, and other objects in view that will hereinafter appear, the nature of the invention will be more clearly understood by reference to the following detailed description, the appended claims and the several views illustrated in the accompanying drawings.

Figure 1:
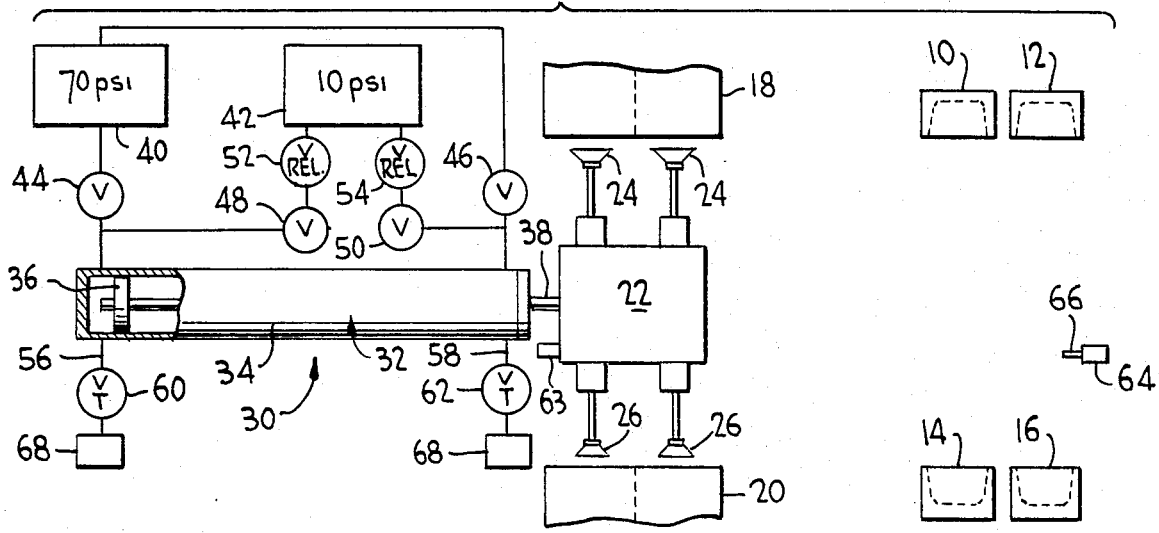
FIG. 1 is a schematic elevational view taken through a molding machine showing the relationship of a labeler head with label hoppers and open molds as well as the pneumatic feed system.

Referring now to the drawings in detail, it will be seen that there is illustrated in FIG. 1 a conventional label transfer apparatus in conjunction with a dual parison blow molding machine. The blow molding machine, at each station, has, in a typical machine, outer, radially movable mold halves 10 and 12 which are associated with inner fixed mold halves 14 and 16, respectively. At the time labels are to be inserted in the mold halves, the molds are open, having recently discharged blow molded articles, such as bottles, to which the labels are to be applied and are moving towards a station wherein parisons are received therein.

This invention relates solely to the placing of labels in the blow mold halves so that when an article is blow molded in the molds, the labels will be incorporated in the articles.

In order that the necessary labels may be placed in the blow mold halves 10, 12, 14 and 16, there is provided a pair of opposed label hoppers 18 and 20 which may be of a divided construction so as to simultaneously dispense two labels. Between the hoppers 18, 20 is illustrated a labeler head 22 which carries a plurality of pickup heads 24 and 26, the pickup heads 24 being associated with the hopper 18 and the pickup heads 26 being associated with the hopper 20.

In the general operation of the label applying apparatus, the labeler head 22 is first aligned with the hoppers 18, 20 and the pickup heads 24, 26 are actuated to engage foremost labels and retract them from the hoppers 18, 20. Then the labeler head 22, carrying the picked up labels, is moved to the right to a position aligned with the mold halves 10, 12, 14 and 16. Once the labeler head 22 is so positioned, the pickup heads 24, 26 are again extended so as to place the labels carried thereby in the mold halves. Once the labels have been so placed, the labeler head 22 returns to its original postion for receiving a further set of labels.

It is to be understood that the blow molding machine of which the mold halves 10, 12, 14, 16 are parts generally rotates about a horizontal axis and presents 70 sets of mold halves for receiving labels per minute. Thus the labeler head 22 must pick up a set of labels, move the labels into alignment with the mold halves, place the labels in the mold halves, and return to its position in alignment with the hoppers 18, 20, 70 time per minute.

Prior systems utilizing simple pneumatic circuitry were found to be satisfactory when the labeler head 22 carried only one pair of pickup heads and there was a single set of mold halves in which the labels were to be placed. However, when the labeler head 22 was increased in size so as to pick up two sets of labels and deliver them to a dual parison molding machine, the increase in weight of the labeler head presented problems which could not be overcome by minor modifications in the existing systems. Accordingly, there was developed a system for positioning the labeler head and shifting the same which would operate at the rate of 70 cycles per minute as required by the molding machine.

The labeler head 22 is shifted in position and positioned by a pneumatic feed system generally identified by the numeral 30. The feed system 30 includes an extensible pneumatic motor 32 which includes an elongated cylinder 34 having mounted therein for reciprocation a piston 36 to which there is connected a piston rod 38, the piston rod 38, in turn, being connected to the labeler head 22 for effecting the shifting thereof.

At this time it is pointed out here that the diameter of the cylinder 34 is greater than that which would be required under operating pressure to effect the shifting of the labeler head 22. This is a feature of the invention.

There is associated with the cylinder 34 a high pressure gaseous supply which will normally contain air or other gas at a pressure on the order of 70 psi. There will also be a low pressure gaseous supply 42 which will normally carry air or other gas at a low pressure on the order of 10 psi.

The high pressure supply 40 is connected to opposite ends of the cylinder 34 by way of control valves 44, 46. In a like manner, the low pressure supply 42 will be connected to opposite ends of the cylinder 34 by way of control valves 48, 50. There is, however, connected in the line between each of the control valves 48, 50 and the low pressure supply 42 a pressure release valve 52, 54, respectively. Each pressure release valve 52, 54 is set to operate at approximately the pressure of the low pressure supply 42.

There is also connected to opposite ends of the cylinder 34 exhaust lines 56, 58. Each of these exhaust lines has incorporated therein an adjustable throttle valve 60, 62, respectively for controlling the rate of gas flow through the respective exhaust line. Each of the exhaust lines 56, 58 terminates in a muffler 68.

There is also associated with the labeler head 22 in each of the two fixed positions thereof hydraulic shock absorber units 63, 64 which are of the spring return type and which springs are compressible. The shock absorbers 63, 64 are provided with retractable plungers 66 which are engaged by the labeler head 22 so as to effect the compression of the springs of the shock absorber.

Merely by way of example, the invention has been successfully tested by way of a labeler head having a weight on the order of 13.5 lbs. with the cylinder 34 having a diameter of two inches and each shock absorber unit requiring a load of 22 lbs. to effect compression thereof. An example of the pressures of the high and low pressure gaseous sources has already been given.

It is to be understood that at the start up of the system, the right end of the cylinder 34 will be connected to the low pressure gaseous source 42, as shown in FIG. 1, and the left end of the cylinder will be exhausted through the exhaust line 56. The low pressure is sufficient to hold the labeler head 22 against the shock absorber 63 with the springs thereof in a compressed state and the shock absorber controlling the fixed position of the labeler head 22.

At this time the labeler head 22 is actuated to pick up the necessary labels and is now ready to be moved into alignment with the mold halves 10–16.

Figure 2:
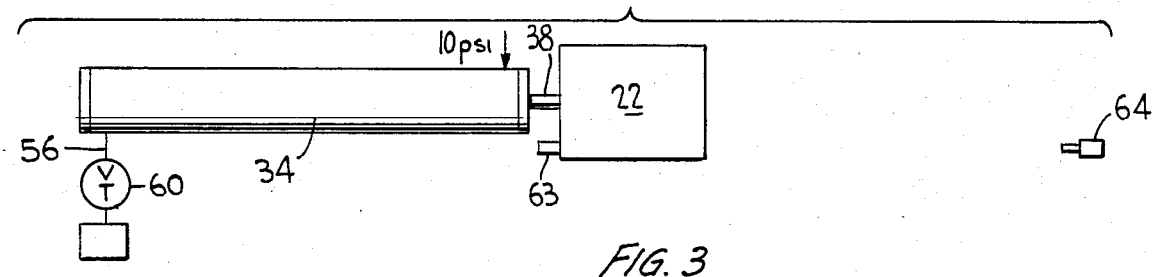
FIG. 2 is a schematic view showing the labeler head in one of its fixed positions.
Figure 3:
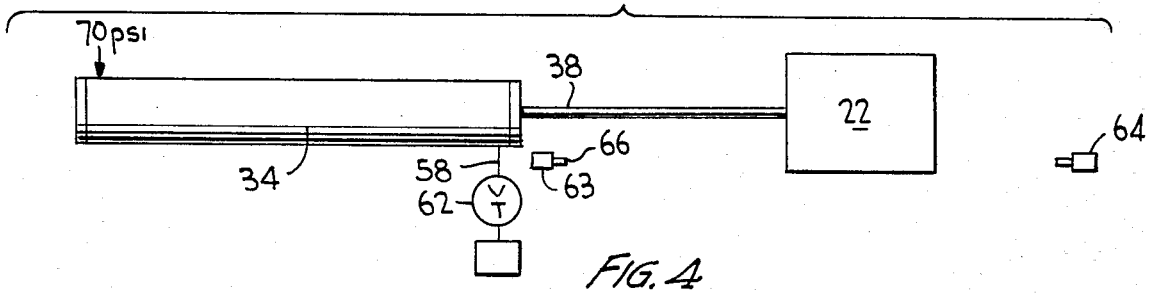
FIG. 3 is a view similar to FIG. 2 and shows the labeler head being advanced towards the other fixed position.

It is to be understood that at this time the valves 44, 46 and 48 are closed. Now the valve 50 is closed and the valve 44 is open to introduce high pressure gas to the left end of the cylinder as shown in FIG. 2. This results in the rapid movement of the piston 36 to the right moving the labeler head 22 to the right. The size of the line leading from the high pressure supply 40 to the cylinder 34 and the size of the valve 44 is such that gas under pressure will be introduced into the left end of the cylinder 34 at a much higher rate than it will be exhausted through the exhaust line 58 with the result that while there is substantially no resistance to the movement of the piston 36 to the right upon the initiation of the feed, as the piston 36 moves to the right, the gas initially in the right part of the cylinder 34 will be compressed and will offer more and more resistance to the movement of the piston so as provide for the deceleration of the piston 36 and the labeler head 22 as the labeler head 22 approaches its position in alignment with the mold halves. This relationship is shown in FIG. 3.

Figure 4:
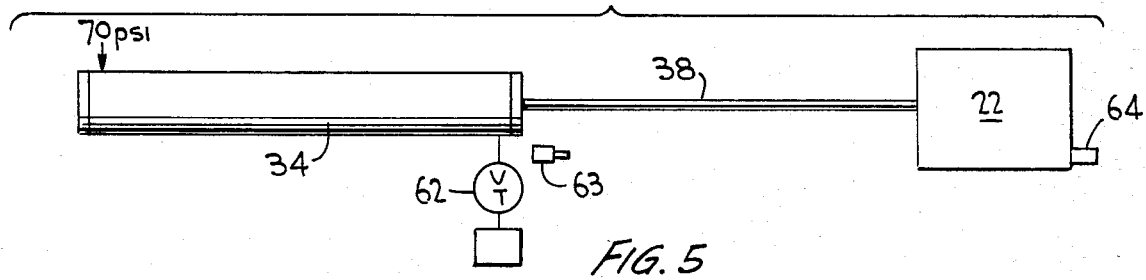
FIG. 4 is another schematic view similar to FIG. 2 and shows the labeler head having reached its other fixed position.
Figure 5:
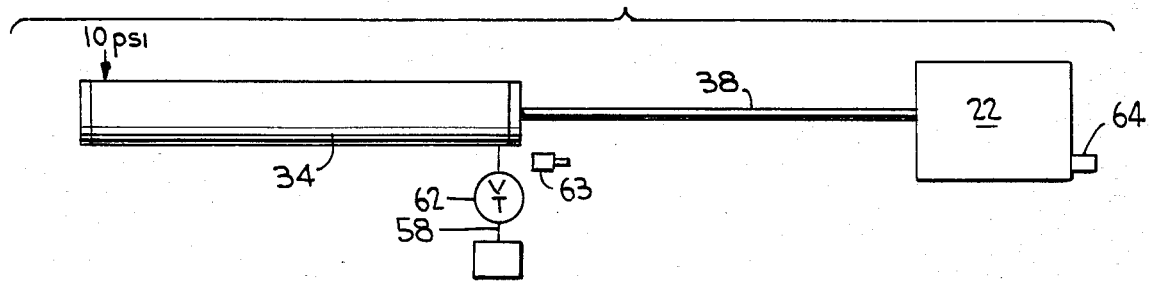
FIG. 5 is a further schematic view similar to FIG. 2 and shows the change in the pneumatic system which occurs while the labeler head is functioning to apply labels to the mold halves.

It is to be understood that there is no change in the pneumatic flow to the cylinder 34 until after the labeler head 22 engages the shock absorber arrangement 64 and the springs thereof are compressed, as shown in FIG. 4. However, as soon as the labeler head 22 reaches the position of FIG. 4, the valve 44 will be closed and the valve 48 will be open. At this time the relief valve 52 will vent the high pressure from the left end of the cylinder 34, but the pressure will be maintained at generally that of the low pressure supply 42 and thus generally at 10 psi as shown in FIG. 5. This pressure is sufficient to hold the shock absorber unit 64 in its compressed state and therefore no movement of the labeler head 22 by the shock absorber unit 64 will be effected. At the same time, the pressure in the right end of the cylinder 34 will vent to generally atmospheric.

As soon as the labels have been deposited in the mold halves, and the pickup heads 24, 26 have retracted to the point where they will clear the mold halves, the throttle valve 62 will close, the throttle valve 60 will open and the supply valve 46 will open so as to initiate the return cycle with the return cycle being identical to that of the advance cycle. The labeler head 22 will eventually come into engagement with the shock absorber unit 63 and the final position thereof will be fixed thereby with the springs of the shock absorber unit 63 compressed and the labeler head 22 held against the shock absorber unit 63 by the low pressure in the right end of the cylinder 34.

Although no specific control means have been illustrated for the purpose of automatically operating the various valves of the pneumatic system, it is to be understood that this is to be accomplished in a conventional manner. Preferably there will be associated with the labeling head position detectors which, in association with detectors for the position of the mold halves, will automatically operate the valves in the required time sequence.

Although only a preferred embodiment of the system has been specifically illustrated and described herein, it is to be understood that minor variations may be made therein without departing from the spirit and scope of the invention as defined by the appended claims.

I claim:

1. A pneumatic back and forth feed system for a device having a dwell time at each end of its stroke, said feed system comprising a linear pneumatic motor having a fixed cylinder and a piston mounted in said cylinder for reciprocation, said cylinder having at each end thereof a supply port and a separate discharge port, a discharge line connected to each discharge port, said discharge line opening to atmosphere and having therein a restricted flow control member, a supply line connected to each supply port, a high pressure gaseous supply and a low pressure gaseous supply, a control valve separately connecting each of said gaseous supplies to each of said supply lines to selectively supply gas under pressure at one of said pressures to each end of said cylinder, said control valve for said high pressure supply being operable at the beginning of a stroke of said piston to admit high pressure gas to said cylinder at the beginning of a stroke with said high pressure gaseous supply being means for effecting rapid acceleration of said piston at the beginning of a stroke, said flow control members being operable to exhaust gas from each end of said cylinder at a rate lesser than the rate of gaseous supply into the opposite end of said cylinder from said high pressure source, said flow control members forming means for effecting deceleration of said piston near the end of a stroke, compressible shock absorber means at each end of said stroke, said control valve for said low pressure supply provides low pressure when a respective shock absorber means is compressed, and said low pressure reacting on said piston is sufficient to retain the compressed state of the respective shock absorber means.

2. A pneumatic feed system according to claim 1 wherein there is a pressure relief valve between said low pressure gaseous supply and the respective control valve to provide for the reduction of said high pressure in a respective end of said cylinder while assuring the maintaining of at least said low pressure in said cylinder end.

3. A pneumatic feed system according to claim 2 wherein each pressure relief valve is set for a pressure on the order of and greater than that of said lower pressure source.

4. A pneumatic feed system according to claim 1 wherein the device is coupled to said feed system and the cross-sectional size of said piston is greatly in excess of that required to actuate said device at a preselected pressure.

5. A pneumatic feed system according to claim 1 wherein the device is coupled to said feed system and said device is a double labeler wherein two sets of labels are simultaneously applied.

6. A method of rapidly feeding a device between two spaced fixed locations, said method comprising the steps of providing a linear pneumatic motor including a cylinder having gaseous supply and discharge means at opposite ends thereof, connecting the device to a piston of the cylinder, introducing a gas under high pressure at one end of the cylinder to provide for a rapid acceleration of the piston towards the other end of the cylinder while retarding the flow of gas from said other end to thereafter effect a gradual resistance to movement of the piston toward the cylinder other end thereby effecting a deceleration of the piston, when the device reaches a selected one of the fixed locations permitting the gas in the cylinder other end to exhaust while reducing the gaseous pressure applied to the cylinder one end to hold the piston at the selected one fixed location, providing compressible shock absorber means at each of said fixed locations for engagement by the device when moved to the fixed location, the reduced gaseous pressure is of a pressure sufficient to maintain the compression of the shock absorber means by the device to maintain the device stationary at each of the fixed locations against return by the compressed shock absorber means, and reversing the steps to move the piston to the cylinder one end and the device to the other of the fixed locations.

7. The method of claim 6 wherein the gaseous pressure is reduced by connecting the one end to a positive low pressure gaseous source and to a pressure relief valve.

* * * * *